United States Patent

[11] 3,558,094

| [72] | Inventors | Arthur O. Radke<br>Milwaukee;<br>Donald J. Zach, Greenfield; Garth O. Hall,<br>New Berlin, Wis. |
|---|---|---|
| [21] | Appl. No. | 842,257 |
| [22] | Filed | July 16, 1969 |
| [45] | Patented | Jan. 26, 1971 |
| [73] | Assignee | Universal Oil Products Company<br>Des Plaines, Ill.<br>a corporation of Delaware |

[54] VEHICLE SEAT HAVING OPTIMUM ANGULAR MOTION CHARACTERISTICS
9 Claims, 6 Drawing Figs.

[52] U.S. Cl. ................................................ 248/372,
248/400, 297/308
[51] Int. Cl. .................................................... A47c 3/38,
B60n 1/02
[50] Field of Search .......................................... 248/372,
378, 394, 399, 400; 297/307, 308

[56] References Cited
UNITED STATES PATENTS

| 2,284,352 | 5/1942 | Zank | 248/400 |
| 2,636,544 | 4/1953 | Hickman | 248/399 |
| 3,227,435 | 1/1966 | Greer | 248/399 |
| 3,300,203 | 1/1967 | Carter et al. | 248/400 |
| 3,325,136 | 6/1967 | Radke et al. | 248/400 |

FOREIGN PATENTS

| 405,958 | 1/1966 | Sweden | 248/399 |

*Primary Examiner*—Marion Parsons, Jr.
*Attorneys*—James R. Hoatson, Jr. and Philip T. Liggett ABSTRACT: A seat having a cushion part, a base part, a spring means biasing the cushion part vertically away from the base part, guides restraining the relative movement of the cushion with respect to the base in both lateral and fore and aft directions, and forward and rear shock absorbers divided into upper and lower compartments by pistons and respectively connected to the forward and rear portions of the cushion part. The upper surface area of the piston of the rear shock absorber is equal to the area of the lower surface of the piston of the forward shock absorber multiplied by the ratio of the respective distances from the knee point of a seat occupant to the front portion of the cushion part and from the knee point of a seat occupant to the rear portion of the cushion part. A connection tube joins the lower compartment of the forward shock absorber and the upper compartment of the rear shock absorber.

PATENTED JAN 26 1971
3,558,094
SHEET 1 OF 2
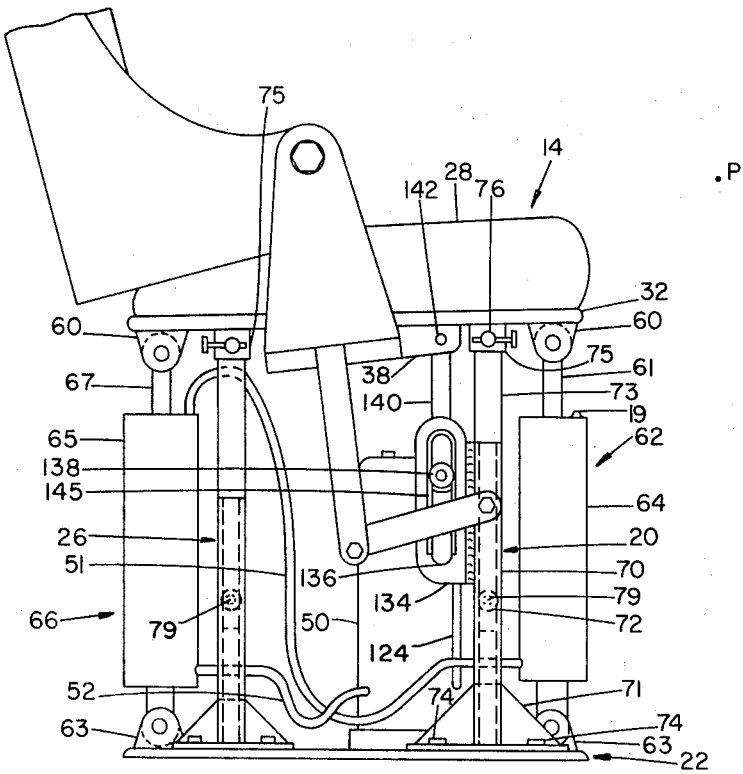
FIGURE 1
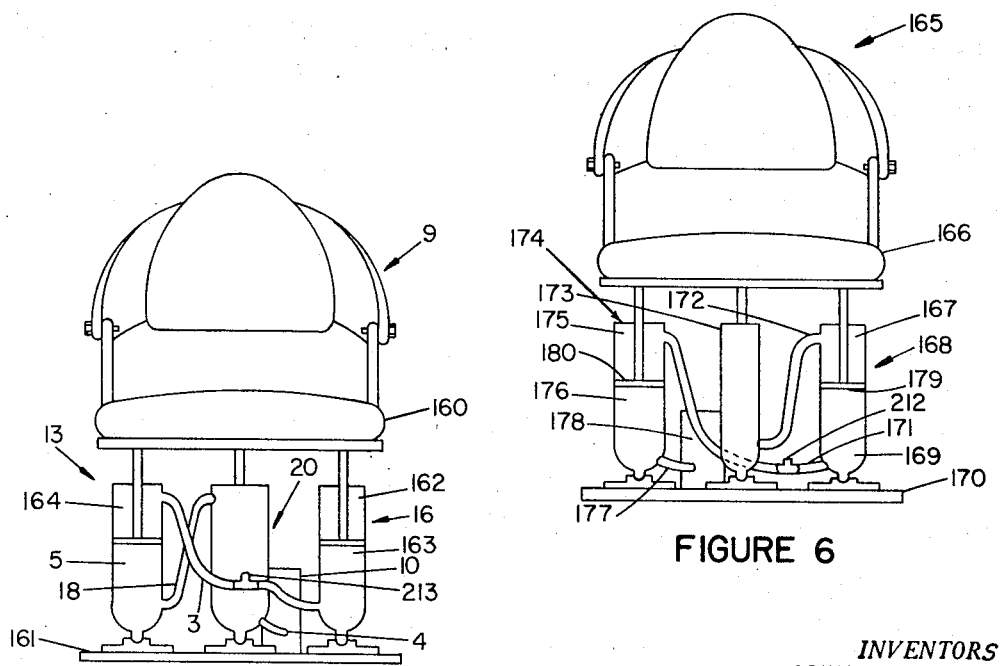
FIGURE 5
FIGURE 6
INVENTORS:
ARTHUR O. RADKE
GARTH O. HALL
DONALD J. ZACH
BY James R. Hoatson, Jr.
Philip J. Liggett
ATTORNEYS

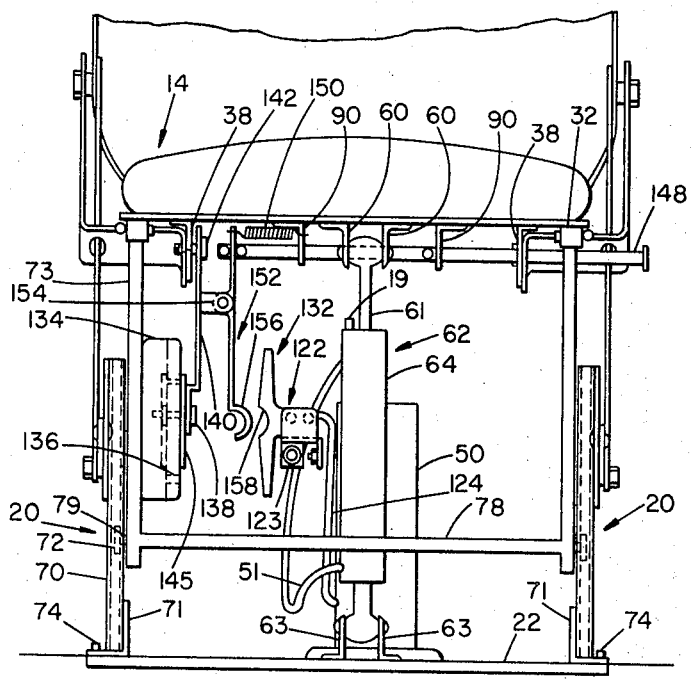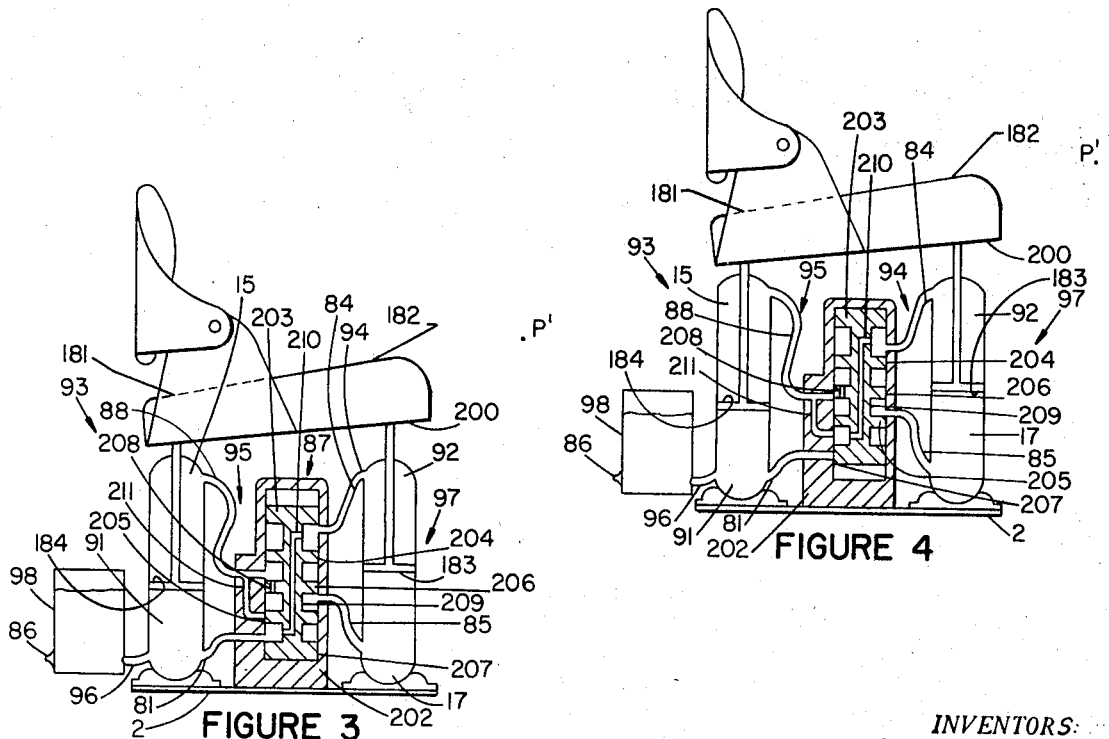

VEHICLE SEAT HAVING OPTIMUM ANGULAR MOTION CHARACTERISTICS

BACKGROUND OF THE INVENTION

This invention relates to a seat having a cushion part, a base part, spring means biasing the cushion part vertically away from the base part, guides restraining the relative movement of the cushion part with respect to the base part in both lateral and fore and aft directions, and forward and rear shock absorbers divided into upper and lower compartments by pistons and respectively connected to the forward and rear portions of the cushion part. The area of the upper surface of the piston of the rear shock absorber is equal to the area of the lower surface of the piston of the forward shock absorber multiplied by the ratio of the respective distances from the knee point of a seat occupant to the front portion of the cushion part and from the knee point of a seat occupant to the rear portion of the cushion part. A connection tube joins the lower compartment of the forward shock absorber and the upper compartment of the rear shock absorber. Both portions of the cushion part thereby move at substantially the same angular velocity about the aforesaid knee point during oscillation of the cushion part with respect to the base part.

The novelty of a seat embodying the present invention resides in the type of movement of the occupant supporting components of the seat with respect to the base part during oscillation of the seat, and in the unique construction used in the seat to achieve this movement.

In the seating art, relative motion of the cushion part with respect to the base part is usually controlled by a linkage which connects the cushion and base parts and limits the relative movement of the cushion part to a predetermined path. In some instances, separate linkage or guide members are provided to control the path of a back part. Prior to this invention, shock absorbers which have been used to control the relative motion of the seat part with respect to the base part have limited the relative motion to either a strictly vertical motion or a vertical motion with relative rotation about a randomly fixed or a moving point. Such motion of the seat and its occupant is neither ideal for comfort nor for maintaining operator control over the foot controls of the vehicle. In these conventional seats, there is a great deal of movement of the occupant's lower legs. This is hazardous at times, especially when the occupant seeks to maintain control of the clutch, brake, bright lights, and other controls which are commonly operated by foot in a vehicle.

In the present invention, however, selective positioning, of the axis of relative rotation of the seat cushion part with respect to the base part causes virtually no movement of the lower legs of the seat occupant. As disclosed in detail in this specification, the relative movement between the seat and the base parts can be improved to provide greater comfort to the occupant, as well as to further improve his ability to maintain control over the hand and foot controls of the vehicle or machine. This is particularly important for applications in which the vehicle or equipment is subjected to a great deal of shock or vibrating conditions.

The benefits of this invention are attained by providing a seat in which the entire cushion part moves relative to the base part in a pivoting movement about a predetermined point which coincides approximately with the knees of the seated occupant. In other words, whether the cushion part moves toward or away from the base part, the linear velocity of the front portion of the cushion part is less than the linear velocity of the rear portion, though the angular velocity of both portions about the knee point of the occupant is substantially the same.

This concept of pivotal motion of the cushion part with respect to the base part of the seat permits a substantial increase in the stroke or in the permissive relative vertical movement between the cushion part and the base part without affecting the occupant's legs below the knee, and thereby does not interfere with his ability to maintain control over the foot controls of the vehicle. This type of motion permits the total stroke of the seat part at its rear to be in the neighborhood of 8 inches whereas, in conventional hydraulically controlled seats the stroke is limited to approximately hydraulically controlled seats the strike is limited to approximately one-half this distance. In seats having a pure vertical or rectilinear motion, such as are currently in use, an increase in the stroke beyond about 4 inches will usually tend to pull the occupant's feet off the foot controls at the top of the stroke. This is caused by the upward travel of the front of the cushion part. A further practical limitation in conventional seats is that an upward travel greater than 4 inches will generally cause the operator's knees to interfere with the operation of the steering wheel and the hand controls of the vehicle. Also, at the bottom of the stroke, the occupant's thighs will be upwardly inclined and therefore will not gain full support from the cushion part. In the seat embodying the present invention, the inclination of the cushion part will vary during the stroke to assure full support of this area throughout the entire stroke.

SUMMARY OF THE INVENTION

The principle object of this invention is to provide a seat in which the cushion part moves relative to the base part in such a manner as to enhance the comfort of the occupant as well as improve his ability to maintain control over the foot controls of the vehicle.

A further important object is to provide a seat having a greater permissible stroke than has heretofore been possible.

Another feature of this invention is that the hydraulic suspension system readily lends itself to height adjustment. In the preferred embodiment of the present invention, there is a hydraulic fluid accumulator with a valve by means of which hydraulic fluid may be introduced to or withdrawn from the accumulator, either directly or through a connection line leading to the accumulator.

Upward height adjustments are also easily made to the seat by adding hydraulic fluid to the system while downward height adjustments may be made by withdrawing fluid from the system. Adding fluid to the system raises the pistons within the shock absorbers thereby raising the cushion part of the seat, while withdrawing hydraulic fluid has the opposite effect.

In a broad aspect this invention is a seat comprising: a cushion part having front and rear portions; a base part; a spring means biasing said cushion part vertically away from said base part; guides that restrain movement of said cushion part with respect to said base part in lateral and fore and aft directions; a first forward shock absorber connecting said front portion of said cushion part to said base part and comprising a piston which divides a cylinder into upper and lower compartments; a first rear shock absorber connecting said rear portion of said cushion part to said base part and comprising a piston which divides a cylinder into upper and lower compartments, and the area of the upper surface of said rear piston is equal to the area of the lower surface of said forward piston multiplied by the ratio of the respective distances from a point ahead of the front edge of said cushion part generally in the area of the knee of a seat occupant to the front portion of said cushion part, and from the same knee point to the rear portion of said cushion part: and a first connection tube between said lower compartment of said forward shock absorber and said upper compartment of said rear shock absorber, whereby both of said portions of said cushion part move at substantially the same angular velocity about the aforesaid knee point during oscillation of said cushion part with respect to said base part. The terms front portion and rear portion of the cushion part when used to describe the distances from the knee point in determining the above ratio may be taken to be the points at which the first forward and rear shock absorbers are joined respectively to the forward and rear portions of the cushion part.

The cushion part may be biased away from the base part by any conventional spring means mounted between the cushion part and base part, such as an air spring, coil spring, torsion spring, leaf spring, and the like. Preferably, however, the spring means is comprised of a second connection tube connecting the lower compartment of the rear shock absorber to a hydraulic accumulator charged with hydraulic fluid and with a quantity of gas, usually either air or nitrogen. For this embodiment of the spring means to be operative, the upper and lower compartments of each of the shock absorbers must be sealed from each other by the piston located within the cylinder of each of the shock absorbers. That is, the piston must form a fluid tight seal between the upper and lower compartments within each shock absorber. Each piston must form such a seal whether or not this preferred form of spring means if employed, for the only embodiment of the seat which will be operational which utilizes a different type of spring means without an accumulator will necessarily involve a connection between the lower compartment of the rear shock absorber to the upper compartment of the forward shock absorber so that the same volume of hydraulic fluid will pass between the lower compartment of the rear shock absorber and the upper compartment of the forward shock absorber as passes between the lower compartment of the forward shock absorber and the upper compartment of the rear shock absorber during oscillation of the cushion part.

Normally, the shock absorbers used in this invention are positioned so that the upper compartments of the shock absorbers surround the piston shafts and the lower compartments of the shock absorbers are on the opposite sides of the pistons from the piston shafts. While the attachment of the components of the shock absorbers may be reversed, that is, the piston rods attached to the base and the cylinders attached to the cushion part; all the shock absorbers must in any case be attached uniformly with all the pistons rods extending either upwards to the cushion part or downwards to the base part.

In some modifications of this invention a leveling system is included so that the cushion part will maintain a level position even though the seat occupant shifts his weight from side to side. This leveling system involves the addition of another shock absorber, either at the front or the rear of the seat. If a second rear shock absorber is used, it is positioned to connect the rear portion of the cushion part to the base part, and like the other shock absorbers, comprises a piston which divides a cylinder into upper and lower compartments. If this second rear shock absorber is used, both of the rear shock absorbers are positioned laterally opposite each other beneath the cushion part, one on the right hand side of the seat and one on the left. The area of the lower surface of the piston of the first rear shock absorber equals the area of the upper surface of the piston of the second rear shock absorber. A second connection tube joins the lower compartment of the first rear shock absorber to the upper compartment of the second rear shock absorber. As a result, a downward displacement of the piston of the first rear shock absorber will force hydraulic fluid from the lower compartment of the first rear shock absorber into the upper compartment of the second rear shock absorber. Since the cross-sectional areas of these two compartments are identical, a transfer of a volume of hydraulic fluid from the first shock absorber will cause a downward piston displacement in the second rear shock absorber identical to the downward displacement of the piston in said first rear shock absorber. The rear shock absorbers are thereby slaved together so that piston movements within one will produce identical piston movements within the other. In the interconnection of rear shock absorbers as described, a third connection tube connects the lower compartment of the second rear shock absorber to an airtight hydraulic fluid accumulator precharged with hydraulic fluid and with a quantity of gas. A further refinement of this embodiment of the seat of this invention incorporates a leveling system which will allow the seat to remain level as the vehicle travels tilted laterally to one side over a prolonged period of time. This involves adding or withdrawing hydraulic fluid through a valve into the second connection tube, the lower compartment of the first rear shock absorber, or the upper compartment of the second rear shock absorber.

A similar modification of this invention involves the use of a second forward shock absorber as a leveling means. In this instance a second connection tube connects the lower compartment of the rear shock absorber to an airtight hydraulic fluid accumulator precharged with hydraulic fluid and a quantity of gas. In such an embodiment, the second forward shock absorber connects the front portion of the cushion part to the base part and, like the other shock absorbers, is comprised of a piston which divides a cylinder into upper and lower compartments. The forward shock absorbers are positioned laterally opposite each other beneath the cushion part as were the two rear shock absorbers used as a leveling means. The area of the lower surface of the piston of the second forward shock absorber equals the area of the upper surface of the piston of the first forward shock absorber. A third connection tube joins the lower compartment of the second forward shock absorber and the upper compartment of the first forward shock absorber so that these forward shock absorbers are slaved together as has been previously described in connection with the rear shock absorbers used as a leveling means.

A valve in the third connection tube, the upper compartment of the first forward shock absorber, or the lower compartment of the second forward shock absorber, may be incorporated into the seat to insure that the seat is level as the vehicle travels laterally across a sloping surface, such as in sidehill operation. Adding hydraulic fluid into the system through such a valve will raise the level of the side of the seat beneath which the second forward shock absorber is positioned. Withdrawing fluid through the valve will lower that same side of the seat.

In a preferred modification to any form of this invention, there is a valve in the hydraulic accumulator, the lower compartment of the rear or second rear shock absorber or the connection tube therebetween through which hydraulic fluid may be injected or withdrawn. This will allow the static height of the cushion part with respect to the base part to be adjusted to conform to the height and weight of the seat occupant. A static height adjustment system may be easily incorporated into an embodiment of the seat of this invention which utilizes only one front and one rear shock absorber by adding a shunt means. This shunt means divides the first connection tube into upper and lower segments. It also divides a third connection tube into an upper segment connecting the upper compartment of the forward shock absorber to the shunt means, and a lower segment connecting the lower compartment of the rear shock absorber to the shunt means. The shunt means in a first position provides a passageway between the upper and the lower segments of the first connection tube and a separate passageway between the upper and lower segments of the third connection tube. In a second position, the shunt means provides a passageway interconnecting the upper segments of the first and third connection tubes and the lower segment of the first connection tube, and in addition, blocks flow in the lower segment of the third connection tube. In the first of these positions, the shunt means allows angular rotation of the cushion part about the knee point of a seat occupant while the seat oscillates. This is the normal ride position of the shunt means. In the second position, however, the shunt means allows the height of the cushion to be increased by the injection of more hydraulic fluid into the accumulator through the valve previously described. The cushion may similarly be lowered by withdrawing hydraulic fluid through the valve. In either direction of height adjustment, the front and rear of the cushion part will remain level since the pistons in the forward and rear cylinders will both be identically displaced if the area of the lower surface of the forward piston is equal to the combined areas of the upper surfaces of both the forward and rear pistons.

The various features of the preferred embodiments of this invention are more clearly illustrated in the attached drawings in which:

DESCRIPTION OF THE DRAWINGS

FIG. 1 is an elevational view of a preferred embodiment of this invention.

FIG. 2 is a front view of the embodiment of FIG. 1.

FIG. 3 is a schematic side view in partial section of another embodiment of this invention in a ride position.

FIG. 4 is a schematic side view in partial section of the embodiment of FIG. 3 in a height adjustment position.

FIG. 5 is a schematic side view in partial section of another embodiment of this invention.

FIG. 6 is a schematic side view in partial section of another embodiment of this invention.

Referring now to FIGS. 1 and 2 there is shown a seat comprised of a seat cushion part 14, a base part 22, a pair of front guide means 20 and a pair of rear guide means 26, a forward shock absorber 62, and a rear shock absorber 66. Front guide means 20 and rear guide means 26 together restrain movement of cushion part 14 with respect to base part 22 in lateral and fore and aft directions.

Cushion part 14 is comprised of a pad 28 and a seat pan 32. Extending vertically downward from seat pan 32 are: four sockets 75, two flanges 38 running fore and aft, two sets of brackets, 60 and 60', and two flanges 90 running fore and aft. Front guide means 20 are located on each side of the seat. Each guide means 20 is comprised of a "C-shaped" channel 70 extending vertically upward from base part 22, a roller 72 which follows in channel 70, and a roller arm 73 which extends downward and is pivotable fore and aft in a socket 75 from seat pan 32. Each channel 70 is welded to a right angle gusset plate 71, which in turn is rigidly connected to base portion 22 by bolt assemblies 74. The upper end of each roller arm 73 has a lateral hole running therethrough perpendicular to the direction of seat alignment. The upper end of each roller arm 73 fits loosely into a socket 75. Each socket 75 is welded to seat pan 32 at one end and has a lateral hole perpendicular to the direction of seat alignment running therethrough. A pivot pin 76 extends through one side of socket 75, through the hole in the upper end of roller arm 73, and out through the opposite side of socket 75. Pivot pin 76, has a head at one end and a tapped hole in the shaft at the other end into which a restraining screw is engaged. This fastening configuration of front guide means 20 to seat pan 32 allows sufficient fore and aft rotation of roller arm 73 is socket 75 to accommodate the change in relative position between cushion part 14 and base part 22 as cushion part 14 rotates about the knee point of a seat occupant. The roller arms 73 are joined by lateral support bar 78 at the level of the rollers 72. Each of rollers 72 is rotatably engaged to a roller arm 73 by a roller axle 79. Rear guide means 26 are of the same construction as front guide means 20 and are fastened to base portion 22 and seat pan 32 as are front guide means 20.

Forward shock absorber 62 is comprised of a cylinder 64, a piston (not visible) and a piston rod 61. The piston divides shock absorber 62 into upper and lower compartments neither of which is visible from the external illustrations of FIGS. 1 and 2. The upper end of piston rod 61 is connected to a set of forward brackets 60 so as to pivot in a fore and aft direction. The cylinder 64 of shock absorber 62 is similarly mounted to a set of brackets 63 extending upward from base portion 22. Rear shock absorber 66, is similarly comprised of a piston, cylinder 65, and a piston rod 67 connected to a set of rear brackets 60'. The cylinder 65 of piston 66 is connected to base part 22 by a set of brackets 63. The piston within each of the shock absorbers 62 and 66 divides each cylinder into an upper cylinder compartment surrounding the piston shaft and a lower cylinder compartment opposite the piston shaft. Both the upper and lower compartments of rear shock absorber 66 contain hydraulic fluid. The lower compartment of forward shock absorber 62 contains hydraulic fluid, but the upper compartment of forward shock absorber 62 contains air and is open to the air through valve 19. The lower compartment of forward shock absorber 62 is connected to the upper compartment of rear shock absorber 66 by a first connection tube 51. The lower compartment of rear shock absorber 66 is connected by a second connection tube 52 to the lower portion of accumulator 50. Accumulator 50 is precharged with hydraulic fluid and has a precharge of nitrogen in its upper portion. While air could be used to precharge accumulator 50, nitrogen is generally used for safety reasons. Shock absorber 66 connects the rear portion of cushion part 14 to base part 22, thereby providing resistance to vertical forces acting between cushion part 14 and base part 22. Forward shock absorber 62 connects the front portion of cushion part 14 to base part 22, thereby also providing resistance to vertical forces acting between cushion part 14 and base part 22. While shock absorbers 62 and 66 are substantially vertical and the lower ends of the cylinders are connected respectively to the front and rear portions of base part 22, operability of the invention does not depend upon this configuration. The lower end of rear shock absorber 66 could be connected to the front part of base 22 while the lower end of forward shock absorber 62 could be connected to the rear part of base 22. It is essential, however, that the area of the upper surface of the piston in rear shock absorber 66 is equal to the area of the lower surface of the piston in forward shock absorber 62 multiplied by the respective distances from a point P ahead of the front edge of cushion part 14 generally in the area of the knee of a seat occupant to the front portion of cushion part 14, approximately at front brackets 60, and from the same knee point P to the rear portion of cushion part 14, approximately at rear brackets 60'. The measurements of these distances may be made between the projections of the point P and brackets 60 and 60' onto the plane of seat pan 32. The areas referred to are cross-sectional areas normal to the axes of the shock absorbers. This configuration is calculated to cause the front portion and the rear portion of cushion part 14 to move at substantially the same angular velocity about point P, which is ahead of the front edge of cushion part 14 and generally in the area of the knee point of the occupant of the seat, in response to vertical forces acting between cushion part 14 and base part 22. When a compressive force, such as occurs when a vehicle drives over a bump in the road, acts between base part 22 and cushion part 14, the piston within shock absorber 62 forces hydraulic fluid through tube 51 from the lower compartment of shock absorber 62 into the upper compartment of shock absorber 66. The piston in shock absorber 66 is forced down and in turn forces hydraulic fluid from the lower compartment of shock absorber 66 into accumulator 50, thereby further compressing a preexisting quantity of gas in the upper portion of accumulator 50 and effecting a counterclockwise rotational motion of cushion part 14 about point P. Conversely, the force built up within accumulator 50 will cause the pistons to reverse direction of travel and cushion part with rotate clockwise about point P. This oscillation will continue with the amplitude being gradually diminished.

A separate spring means biasing cushion part 14 vertically away from base part 22 is unnecessary to the successful operation of this preferred embodiment of the invention. In the embodiment illustrated in FIGS. 1 and 2, the shock absorbers 62 and 66 in combination with accumulator 50 serve as the necessary spring means. An initial precharge of gas creates a pressure on the hydraulic fluid which is transmitted through connection tube 52 to shock absorber 66. The pressure in the lower compartment of shock absorber 66 is transmitted to the lower compartment of shock absorber 62 through the upper compartment of shock absorber 66 and the connection tube 51. The pistons are forced upward, thereby biasing cushion part 14 away from base part 22. When an occupant sits on cushion 14, the initial bias due to the precharge is counteracted, and the pistons in shock absorbers 62 and 66 move downward in the direction of base part 22 and come to rest at some intermediate point. A lightweight occupant will cause the pistons to move only a short distance downward in shock absorbers 62 and 66 while a heavy occupant will cause the pistons to move much further down within the shock absorber cylinders of shock absorbers 62 and 66. It is at this time that the ride position adjustment means is actuated, as will be described, to bring either a heavy or a light seat occupant to approximately the same intermediate static level.

In the embodiment illustrated in FIGS. 1 and 2, the initial precharge of the oil in accumulator 50 is readily adjustable for maximum comfort to the individual occupant of seat through the use of a height adjustment mechanism most clearly illustrated in FIG. 2. The seat is provided with a ride position adjustment mechanism by means of which the pressure within accumulator 50 and the volume of the lower compartment of shock absorber 66 can be adjusted to compensate for the weight of the occupant in such a manner that the statically occupied seat will always be positioned at a midpoint between the permissible amplitude limits of the oscillatory motion of the seat. A change in the volume of the lower compartment of shock absorber 66 will necessarily produce a corresponding change in the volume of the lower compartment of shock absorber 62. This adjustment mechanism is comprised of the three-way valve 122 which has an actuating member 132 by means of which the pressure within accumulator 50 and the volume within the lower compartment of shock absorber 66 may be varied by the introduction or withdrawal of oil. When the actuating member 132 is rotated in the counterclockwise direction, the valve 122 opens a passageway 124 between the lower part of accumulator 50 and a valve port 123 to a supply of high pressure oil. When the actuating member 132 is rotated in a clockwise direction the accumulator 50 is opened to the atmosphere or an oil reservoir.

An adjusting rod 148 is slidably carried by the right hand flanges 38 (FIG. 2) and by flanges 90, both extending downward from seat pan 32. Adjustment rod 148 is biased laterally to the right in FIG. 2, by a spring 150, which is connected to the left hand flange 90 and to the upper end of an index finger 152. Index finger 152 is pivotally secured to the end of the rod 148. The index finger 152 is pivotally connected to the bracket 154 which is mounted on a link 140. When rod 148 is pushed inwardly to the left, in FIG. 2, the index finger 152 will rotate counterclockwise about bracket 154 and engage the actuating member 132 of the three-way valve 122. In the event that the static occupant ride load should depress the seat below its normal midride position, the index finger will engage actuating member 132 rotating it in the counterclockwise direction, thereby opening passageway 124 to valve port 123 to connect the accumulator 50 to a source of high air or oil pressure. By virtue of this coaction of the adjustment mechanism parts, the seat will rise until the arcuate portion 156 of the index finger 152 reaches the depression 158 of the actuating member. At such time the valve 122 will be in the neutral position and will thereby close passageways to and from the upper portion of accumulator 50. On the other hand, if the static occupant load is lighter than the average, the index finger 152 will rotate the actuating member 132 in the clockwise direction until a sufficient amount of oil has been released to the atmosphere or an oil reservoir from accumulator 50 to allow the arcuate portion 156 of index finger 152 to engage the curved and depressed portion 158. As such time, the valve 122 will again be in the neutral or closed position.

The stroke or the maximum amplitude of the oscillation of the seat is controlled by a slot and pin connection between cushion part 14 and base part 22. A steel plate 134 is fixed to the left hand channel 70 (FIG. 2) on the side of channel 70 opposite the open portion thereof. Steel plate 134 is provided with an upwardly extending slot 136. A pin assembly 138 is slidably engaged in slot 136 and is connected by means of link 140 to cushion part 14. The link 140 is secured to cushion part 14 by a pin 142 extending through the left hand flange 38 and link 140. The slot 136 is provided with an appropriate nylon or other antifriction liner 145 to provide proper wear resistance as well as to diminish any noises which might occur due to the sliding motion.

While the seat illustrated in FIGS. 1 and 2 is a preferred embodiment, for various reasons it may be desirable for more conventional spring biasing means such as air cushions, coil springs and the like to be used to bias cushion part 14 away from base part 22. Also it may be more desirable to vary the charge of gas in the accumulator rather than the charge of oil, if an accumulator is used.

A different height adjustment mechanism is illustrated in the embodiment of this invention in FIGS. 3 and 4. In this embodiment as in the other embodiments, the area of the upper surface 184 of the piston of rear shock absorber 93 is equal to the area of the lower surface 183 of the piston of forward shock absorber 97 multiplied by the ratio of the respective distances from point P' ahead of the front edge of the cushion part generally in the area of the knee of a seat occupant to the front portion 182 of the cushion part, and from knee point P' to the rear portion 181 of the cushion part. Front portion 182 is located at the cushion surface perpendicular to seat pan 200 from the point at which forward shock absorber 97 is joined to seat pan 200, and rear portion 181 is located at the cushion surface perpendicular to seat pan 200 from the point at which rear shock absorber 93 is joined to seat pan 200. Measurements between front portion 182, rear portion 181, and point P' may all be made between the projection of these points onto the plane of seat pan 200.

In addition to first connection tube 95, there is a second connection tube 96 connecting the lower compartment 91 of rear shock absorber 93 to accumulator 98. Accumulator 98 is precharged with a quantity of hydraulic fluid and nitrogen and has a valve 86 through which hydraulic fluid may be injected or withdrawn. A shunt means 87 divides first connection tube 95 into an upper segment 88 and a lower segment 85. There is also a third connection tube 94 divided by shunt means 87 into an upper segment 84 connecting the upper compartment 92 of forward shock absorber 97 to shunt means 87, and a lower segment 81 connecting the lower compartment 91 of rear shock absorber 93 to shunt means 87. Shunt means 87 is located at the intersection of third connection tube 94 and first connection tube 95. Shunt means 87, forward shock absorber 97, and rear shock absorber 93 are shown in section in FIGS. 3 and 4. Shunt means 87 is comprised of a solid framework 202 within which a movable valve having a series of spools 203, 204, 205, 206, and 207 of enlarged diameter about an axial connecting rod 209 is located. This movable valve has an axial passageway 210 through connecting rod 209 which connects the space bounded by spools 203 and 204 with the space bounded by spools 206 and 207. The space bounded by spools 205 and 206 is connected to the space bounded by spools 206 and 207 by a passageway 208 through spool 206. The valve can be moved vertically so as to interconnect the various segments of first connection tube 95 and third connection tube 94 in one of two ways. In a first position of shunt means 87 as illustrated in FIG. 3, passageway 208 interconnects upper segment 88 and lower segment 85 of first connection tube 95. The separate passageway 210 interconnects upper segment 84 and lower segment 81 of third connection tube 94 in such a manner that the fluid passing between segments 88 and 85 is isolated from the fluid passing between segments 84 and 81.

In the second position of the shunt means 87, as illustrated in FIG. 4, lower segment 85 of first connection tube 95 opens into the space bounded by by spools 205 and 206. This space in turn is connected to the space bounded by spools 206 and 207 by passageway 208. Upper segment 88 of first connection tube 95 is connected to this latter space by passageway 211 in framework 202. The upper segment 88 and the lower segment 85 of first connection tube 95 are thereby interconnected and are further connected to upper segment 84 of third connection tube 94 by passageway 210. Spool 207 blocks any flow in lower segment 81 of third connection tube 94. In this second position, shunt means 87 thereby provides a passageway interconnecting upper segment 88 and upper segment 84 of the first and third connection tubes respectively, and lower segment 85 of first connection tube 95, while blocking flow in lower segment 81 of third connection tube 94.

In the first position, as illustrated in FIG. 3, the hydraulic fluid cushions the seat and the seat oscillates about the knee point P' of a seat occupant as described in connection with FIG. 1. When the position of the movable valve within shunt means 87 is changed to the second position, however, as illustrated in FIG. 4, the seat is in a state in which its height can be evenly adjusted with an identical displacement of the pistons of shock absorbers 93 and 97. Additional oil may be added to accumulator 98 through valve 86 and the additional pressure will cause the piston in shock absorber 93 to expand lower compartment 91, thereby forcing oil from upper compartment 15 into lower compartment 17, thereby causing the piston within shock absorber 97 to rise. When this piston rises, oil is forced out of compartment 92. This oil also is forced into compartment 17. The shock absorber configuration must be such that for a given parallel linear displacement of the pistons within shock absorbers 93 and 94, the volume of oil displaced from compartments 15 and 92 must equal the volume by which compartment 17 is increased. This is consistent with the critical relationship of the upper surface area of the rear piston and the lower surface area of the forward piston because the diameter of the forward piston rod can be varied to change the upper surface area of the forward piston to alter the volume of compartment 92 to satisfy the volumetric relationship between compartments 15, 17, and 92. Where the volume change of compartment 17 equals the volume change of compartment 92 plus compartment 15, both of the pistons will rise at a uniform rate when oil is introduced into the accumulator through valve 86. Similarly, both of the pistons will fall a uniform distance when oil is withdrawn from the system through valve 86. Level height adjustment of the seat is thereby effected.

Another modification of the seat of this invention includes a leveling system to keep the seat from tipping laterally as the vehicle operator shifts his weight from side to side. One embodiment of a seat so constructed is illustrated in FIG. 5, in which two forward shock absorbers are shown in section. In FIG. 5 there is shown a seat 9 having a first forward shock absorber 13 and a first rear shock absorber 20. A first connection tube 18 connects the upper compartment of the first rear shock absorber 20 to the lower compartment 5 of the first forward shock absorber 13, and a second connection tube 4 connects the lower compartment of rear shock absorber 20 to an airtight hydraulic fluid accumulator 10 precharged with hydraulic fluid and a quantity of gas. A second forward shock absorber 16 connects the front portion of cushion part 160 to base part 161. Second forward shock absorber 16 has a piston which divides a cylinder into an upper compartment 162 and a lower compartment 163. Both of the forward shock absorbers 13 and 16 are positioned laterally opposite each other beneath cushion part 160. Viewed from the front, first shock absorber 13 is at the left hand side of the seat and second shock absorber 16 is at the right hand side of the seat. The area of the lower surface of the piston of shock absorber 16 equals the area of the upper surface of the piston of shock absorber 13. A third connection tube 3 joins lower compartment 163 of shock absorber 16 and upper compartment 164 of shock absorber 13. A force downward on one side of the cushion part 160 will cause the pistons of both forward shock absorbers to move downward. For example, a downward force on the left hand side of the seat will cause the piston in shock absorber 13 to move downward, thereby enlarging compartment 164. Oil is drawn from compartment 163 to fill the void created in compartment 164, so the piston in shock absorber 16 moves downward also. Since the volume of oil displaced from shock absorber 16 equals that introduced into shock absorber 13, the pistons within shock absorbers 13 and 16 will have identical motion. Various upward and downward forces at various points about the seat will not cause the pistons to deviate from their identical motion. One side of the seat can be raised or lowered to make the seat level while the vehicle travels laterally across a slope by introducing or withdrawing hydraulic fluid through a valve 213 in upper compartment 164 of first forward shock absorber 13, lower compartment 163 of second forward shock absorber 16, or connection tube 3. In FIG. 5 the valve 213 is positioned in connection tube 3.

The seat 165 of FIG. 6 utilizes a similar arrangement, but in this illustration there is one forward shock absorber 173 and two rear shock absorbers, a first rear shock absorber 168 and a second rear shock absorber 174, shown in section. Both of the rear shock absorbers connect the rear portion of cushion part 166 to base part 170 and are each comprised of a piston which divides a cylinder into upper and lower compartments. Rear shock absorbers 174 and 168 are positioned laterally opposite each other beneath cushion part 166. Second rear shock absorber 174 is on the left hand side of the seat while first rear shock absorber 168 is on the right hand side of the seat as viewed from the front. As in the other embodiments, a first connection tube 172 connects the lower compartment of forward shock absorber 173 to the upper compartment 167 of first rear shock absorber 168. In addition, a second connection tube joins the lower compartment 169 of first rear shock absorber 173 to upper compartment 175 of second rear shock absorber 174. The area of the lower surface 179 of the piston of the first rear shock absorber 168 equals the area of the upper surface 180 of the piston of second rear shock absorber 174. A third connection tube 177 connects the lower compartment 176 of second rear shock absorber 174 to an airtight hydraulic fluid accumulator 178 precharged with hydraulic fluid and with a quantity of gas.

A downward force on one side of the cushion part 166 will cause the piston of both shock rear absorbers to move downward in unison. For example, a downward force on the right hand side of the seat will cause the piston in shock absorber 168 to move downward, thereby enlarging compartment 167 and drawing hydraulic fluid from forward shock absorber 173 through connection tube 172 to fill the additional volume in compartment 167. In addition, hydraulic fluid is forced out of lower compartment 169 into upper compartment 175 of the second rear shock absorber 174. This forces the piston in this shock absorber down to the same extent that the piston in shock absorber 168 was forced down. First rear shock absorber 168 and second rear shock absorber 174 are thereby effectively slaved together so that the pistons within these shock absorbers will have identical motion. Various upward and downward forces at various points about the seat will not cause these pistons to deviate from their identical motion. One side of the seat can be raised or lowered, however, to make the seat level while the vehicle travels laterally across a slope if a valve 212 is included in the lower compartment 169 of first rear shock absorber 168, upper compartment 175 of second rear shock absorber 174, or connection tube 171. Hydraulic fluid may be added or withdrawn through this valve to change the relative levels of the pistons within the rear shock absorbers. The valve 212, as illustrated in FIG. 6, is positioned in connection tube 171.

The foregoing detailed descriptions of several of the embodiments of this invention have been given for clearness of understanding only, and no unnecessary limitation should be constructed therefrom, as other modifications will be obvious to those skilled in the art.

We claim:
1. A seat comprising:
   a. a cushion part having front and rear portions;
   b. a base part;
   c. a spring means biasing said cushion part vertically away from said base part;
   d. guides that restrain movement of said cushion part with respect to said base part in lateral and fore and aft directions;
   e. a first forward shock absorber connecting said front portion of said cushion part to said base part and comprising a piston which divides a cylinder into upper and lower compartments;
   f. a first rear shock absorber connecting said rear portion of said cushion part to said base part and comprising a piston which divides a cylinder into upper and lower compartments, and the area of the upper surface of said rear piston is equal to the area of the lower surface of said forward piston multiplied by the ratio of the respective distances from a point ahead of the front edge of said cushion part generally in the area of the knee of a seat occupant to the front portion of said cushion part, and from the same knee point to the rear portion of said cushion part; and g. a first connection tube between said lower compartment of said forward shock absorber and said upper compartment of said rear shock absorber, whereby both of said portions of said cushion part move at substantially the same angular velocity about the aforesaid knee point during oscillation of said cushion part with respect to said base part.

2. The seat of claim 1 further characterized in that said upper compartments of said shock absorbers surround the piston shafts and said lower compartments of said shock absorbers are on the opposite sides of said pistons from said piston shafts.

3. The seat of claim 2 further characterized in that a second rear shock absorber connects said rear portion of said cushion part to said base part and comprises a piston which divides a cylinder into upper and lower compartments, both of said rear shock absorbers are positioned laterally opposite each other beneath said cushion part, and the area of the lower surface of said piston of said first rear shock absorber equals the area of the upper surface of said piston of said second rear shock absorber, and a second connection tube joins the lower compartment of said first rear shock absorber to the upper compartment of said second rear shock absorber, and a third connection tube connects the lower compartment of said second rear shock absorber to an airtight hydraulic fluid accumulator precharged with hydraulic fluid and with a quantity of gas.

4. The seat of claim 3 further characterized in that there is a valve in said second connection tube whereby hydraulic fluid can be added or withdrawn, thereby changing the relative levels of said pistons within said forward shock absorbers.

5. The seat of claim 2 further characterized in that a second connection tube connects the lower compartment of said rear shock absorber to an airtight hydraulic fluid accumulator precharged with hydraulic fluid and with a quantity of gas.

6. The seat of claim 5 further characterized in that a second forward shock absorber connects said front portion of said cushion part to said base part and comprises a piston which divides a cylinder into upper and lower compartments, both of said forward shock absorbers are positioned laterally opposite each other beneath said cushion part; and the area of the lower surface of said piston of said second forward shock absorber equals the area of the upper surface of said piston of said first forward shock absorber, and a third connection tube joins the lower compartment of said second forward shock absorber to the upper compartment of said first forward shock absorber.

7. The seat of claim 6 further characterized in that there is a valve in said third connection tube whereby hydraulic fluid can be added or withdrawn thereby changing the relative levels of said pistons within said forward shock absorbers.

8. The seat of claim 5 further characterized in that there is a valve in said accumulator through which hydraulic fluid may be injected or withdrawn.

9. The seat of claim 8 further characterized in that there is a shunt means dividing said first connection tube into upper and lower segments, and a third connection tube divided by said shunt means into an upper segment connecting the upper compartment of said forward shock absorber to said shunt means and a lower segment connecting the lower compartment of said rear shock absorber to said shunt means, and said shunt means in a first position provides a passageway between said upper and lower segments of said first connection tube and a separate passageway between said upper and lower segments of said third connection tube, and in a second position said shunt means provides a passageway interconnecting said upper segments of said first and third connection tubes and said lower segment of said first connection tube and blocks flow in said lower segment of said third connection tube.